United States Patent
Zhao et al.

(10) Patent No.: US 11,938,633 B2
(45) Date of Patent: Mar. 26, 2024

(54) AUTONOMOUS ROBUST ASSEMBLY PLANNING

(71) Applicant: FANUC CORPORATION, Yamanashi (JP)

(72) Inventors: Yu Zhao, Santa Clara, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 338 days.

(21) Appl. No.: 17/457,753

(22) Filed: Dec. 6, 2021

(65) Prior Publication Data
US 2023/0173673 A1 Jun. 8, 2023

(51) Int. Cl.
*B25J 9/16* (2006.01)
*B23P 21/00* (2006.01)

(52) U.S. Cl.
CPC ............. *B25J 9/1661* (2013.01); *B23P 21/00* (2013.01)

(58) Field of Classification Search
CPC ...... B25J 9/1687; B25J 9/1653; B25J 9/1661; B23P 21/00
See application file for complete search history.

(56) References Cited

U.S. PATENT DOCUMENTS 8,805,581 B2 * 8/2014 Barajas ............... B25J 9/163
                                              700/250
11,524,410 B2 * 12/2022 O'Hare ............... G01B 21/042
11,565,406 B2 * 1/2023 Yerazunis ............ B25J 15/12
2021/0387301 A1 * 12/2021 O'Hare ............... B25J 9/1697
2022/0118618 A1 * 4/2022 Oleynik ............... B25J 13/089

OTHER PUBLICATIONS

Wirnshofer et al., Robust, Compliant Assembly with Elastic Parts and Model Uncertainty, 2019, IEEE, p. 6044-6051 (Year: 2019).*
Wei et al., Improving robotic assembly performance through autonomous exploration, 2002, IEEE, p. 3303-3308 (Year: 2002).*

(Continued)

*Primary Examiner* — Marc Mcdieunel
(74) *Attorney, Agent, or Firm* — John A. Miller; Shumaker, Loop & Kendrick, LLP

(57) ABSTRACT

A method for tuning the force control parameters for a general robotic assembly operation. The method uses numerical optimization to evaluate different combinations of the parameters for a robot force controller in a simulation environment that is built based on a real-world robotic setup. This method performs autonomous tuning for assembly tasks based on closed loop force control simulation, where random samples from a distribution of force control parameter values are evaluated, and the optimization routine iteratively redefines the parameter distribution to find optimal values of the parameters. Each simulated assembly is evaluated using multiple simulations including random part positioning uncertainties. The performance of each simulated assembly is evaluated by the average of the simulation results, thus ensuring that the selected control parameters will perform well in most possible conditions. Once the parameters have been optimized, they are applied to real robots to perform the actual assembly operation.

25 Claims, 7 Drawing Sheets

(56) References Cited

OTHER PUBLICATIONS

Hebecker et al., Towards Real-World Force-Sensitive Robotic Assembly through Deep Reinforcement Learning in Simulations, 2021, IEEE, p. 1045-1051 (Year: 2021).*
Racca et al., Interactive Tuning of Robot Program Parameters via Expected Divergence Maximization, 2020, IEEE, p. 629-638 (Year: 2020).*
Stemmer, Andreas, A. Albu-Schaffer, and Gerd Hirzinger. "An analytical method for the planning of robust assembly tasks of complex shaped planar parts." Proceedings 2007 IEEE International Conference on Robotics and Automation. IEEE, 2007.
Giordano P. Robuffo, et al. "Robotic assembly of complex planar parts: An experimental evaluation." 2008 IEEE/RSJ International Conference on Intelligent Robots and Systems. IEEE, 2008.

* cited by examiner

AUTONOMOUS ROBUST ASSEMBLY PLANNING

BACKGROUND

Field

The present disclosure relates generally to a method for tuning the parameters that are used in a force control robotic assembly operation and, more particularly, to a method for tuning force control robotic assembly parameters that uses a physical simulation of the assembly process along with numerical optimization to try different combinations of the force control parameters in simulations which include random pose uncertainties, and the optimization converges to a parameter set which is most robust to the uncertainties.

Discussion of the Related Art

The use of industrial robots to repeatedly perform a wide range of manufacturing and assembly operations is well known. However, some types of assembly operations, such as installing a car door with hinge pins onto a car body with hinge pin holes, are still performed manually, where a machine lifts the weight of the door and a human operator aligns the hinge pins with the holes and lowers the door into place. Other assembly operations are also problematic for robots—such as plugging an electrical connector into a mating connector, or any other assembly of one tightly-fitting component into another. These types of operation are still often performed manually because robots have difficulty detecting and correcting the complex misalignments that may arise in tight-tolerance assembly tasks. That is, because of minor deviations in part poses due to both grasping and fixturing uncertainty, the robot cannot simply move a part to its nominal installed position, but rather must "feel" the alignment and fit of one piece into the other.

In order to make assembly tasks robust to these inevitable positioning uncertainties, robotic systems typically utilize force control based functions to compensate for undesired deviations. A traditional way to set up and tune for robotic assembly tasks is by manual tuning, where a human operator programs a real robotic system for the assembly task, runs the program, and adjusts force control parameters carefully (e.g. <10% change each time) in a trial and error fashion. However tuning and set up of these force control functions using physical testing is time consuming and expensive, since manual trial and error has to be performed, and also, when tuning is performed on real systems, re-design may be required if the real system does not meet requirements. Parameter tuning on real physical test systems is also dangerous, since robots are not compliant, and unexpected contact between parts may therefore damage the robot, the parts, or surrounding fixtures or structures.

Systems exist for tuning force control parameters for robotic assembly in a simulation environment, but these existing systems exhibit several limitations. Some of these systems are designed to simulate only one specific type of assembly task—such as peg-in-hole assembly, or planar part installation—and cannot be applied to general assembly tasks because the techniques include pre-programmed motion strategies which are specific to the particular type of assembly task. Other existing systems for parameter tuning in a simulation environment still require significant human experience and expertise for guiding the selection of force control parameters used in the simulations.

In view of the circumstances described above, an improved technique for autonomously tuning force control parameters for general robotic assembly operations is needed.

SUMMARY

The following disclosure describes a method for tuning the force control parameters that are necessary for a general robotic assembly operation, where the method uses numerical optimization to evaluate different combinations of the parameters for a robot force controller in a simulation environment that is built based on a real-world robotic setup. This method performs autonomous tuning for assembly tasks based on closed loop force control simulation, where random samples from a distribution of force control parameter values are selected and evaluated, and the optimization routine iteratively redefines the parameter distribution to find optimal values of the parameters. In order to improve the transfer of simulation results to real world operation, and make the planning result robust to uncertainties, each hypothetical assembly program is evaluated using multiple simulations, in which random uncertainties (e.g. fixture pose error) are used for each simulation instance. The performance of each simulated assembly is evaluated by the average of the simulation results, thus ensuring that the selected control parameters will perform well in most possible conditions. Tuning the parameters in simulation is faster, more cost-effective and safer than tuning the parameters in a physical test environment. Once the parameters have been learned by the simulation, they are applied to real robots to perform the actual assembly operation.

Additional features of the present disclosure will become apparent from the following description and appended claims, taken in conjunction with the accompanying drawings.

DETAILED DESCRIPTION OF THE EMBODIMENTS

The following discussion of the embodiments of the disclosure directed to a method for tuning the parameters that are necessary for a force control robotic assembly operation that uses simulation with numerical optimization to evaluate different combinations of the parameters and includes part positioning uncertainty in the simulations is merely exemplary in nature, and is in no way intended to limit the disclosed techniques or their applications or uses.

The use of industrial robots for a wide variety of manufacturing and assembly operations is well known. The present disclosure is directed to overcoming the challenges encountered in many robotic assembly operations.

Figure 1:
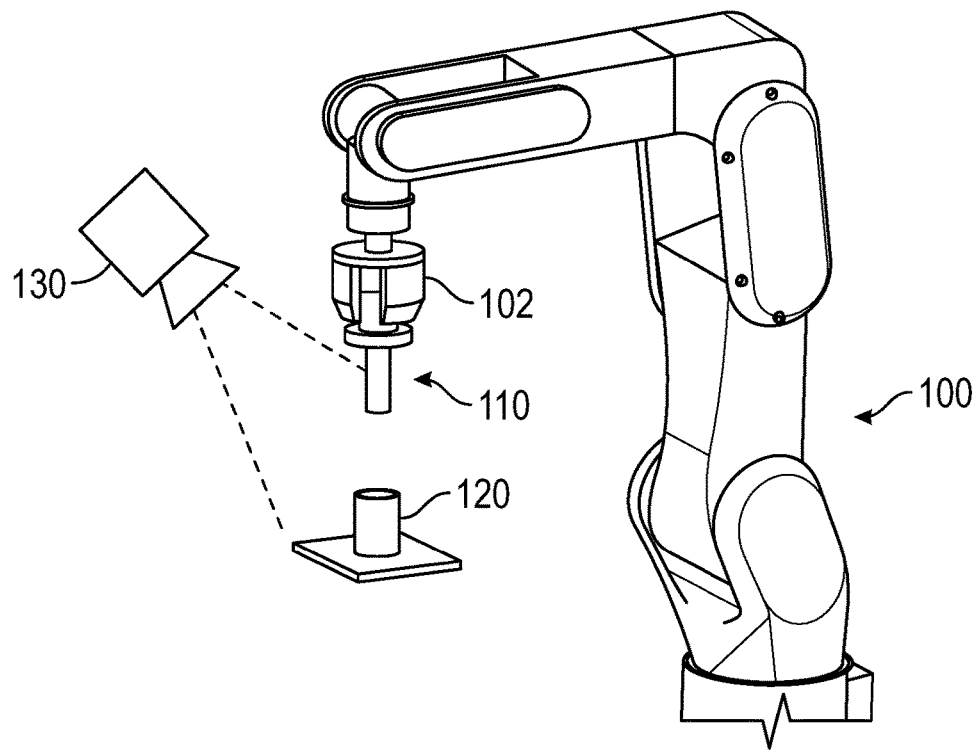
FIG. 1 is an illustration of a robotic assembly operation being performed on tight-tolerance parts, illustrating several sources of part positioning uncertainty which create challenges for robotic assembly operations.

FIG. 1 is an illustration of a robotic assembly operation being performed on tight-tolerance parts, illustrating several sources of part positioning uncertainty which create challenges for robotic assembly operations. A robot 100 having a gripper 102 grasps a first part 110 which is to be assembled with a second part 120. In this example, the first part 110 is a peg part, and the second part 120 is a hole structure. The peg part 110 is to be inserted into a hole in the hole structure 120. The tolerances of the parts in a peg-in-hole assembly are typically quite tight, so that the assembly can operate without excessive looseness after assembled. Some peg-in-hole assemblies have dual coaxial pegs on one part which must be simultaneously inserted into dual holes on the other part, which makes the assembly operation even more difficult. Many other types of mating part assemblies—such as electrical connectors, complex planar shapes, etc.—exhibit similarly tight tolerances.

The types of assembly operations described above are still often performed manually because robots have difficulty detecting and correcting the complex misalignments that may arise in tight-tolerance assembly tasks. That is, because of minor deviations in part poses, the robot cannot simply move a part to its nominal installed position, but rather must "feel" the alignment and fit of one piece into the other. There are many possible sources of errors and uncertainty in part poses. First, the exact position and orientation (collectively, "pose") of the peg part 110 as grasped in the gripper 102 may vary by a small amount from the expected pose. Similarly, the exact pose of the hole part 120 in its fixture may also vary from the expected pose. In systems where a camera 130 is used to provide images of the workspace scene for location identification, perception error can also contribute to the uncertainty of relative part positioning. In addition, calibration errors in placement of the robot 100 and the fixture holding the part 120 in the workspace, and minor robot joint position variations, can all further contribute to part positioning uncertainty.

Figure 2:
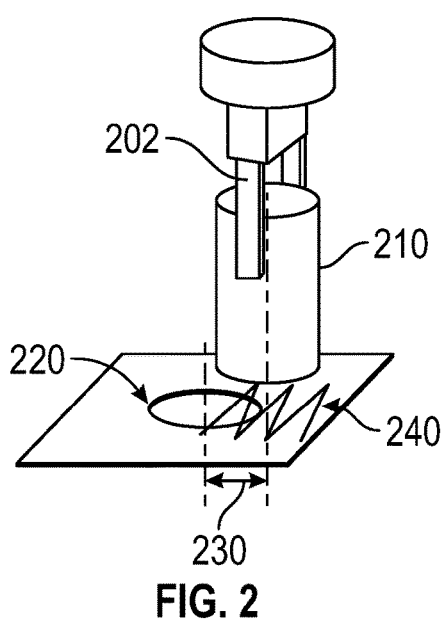
FIG. 2 is an illustration of parts being robotically assembled, where the parts require alignment in a manner which causes the robot to perform a hole search in a plane perpendicular to the insertion axis.

FIG. 2 is an illustration of parts being robotically assembled, where the parts require alignment in a manner which causes the robot to perform a hole search in a plane perpendicular to the insertion axis. A gripper 202 grasps a part 210 which must be inserted into a hole 220 in the same manner as shown in FIG. 1. A distance 230, exaggerated for visual effect, represents the uncertainty in the lateral position of the part 210 relative to the hole 220. In order to find the proper alignment of the part 210 with the hole 220, the robot may be required to perform a hole search, where the gripper 202 moves the part 210 back and forth in a zig-zag pattern 240 in a plane which is perpendicular to the axis of the part 210.

Figure 3:
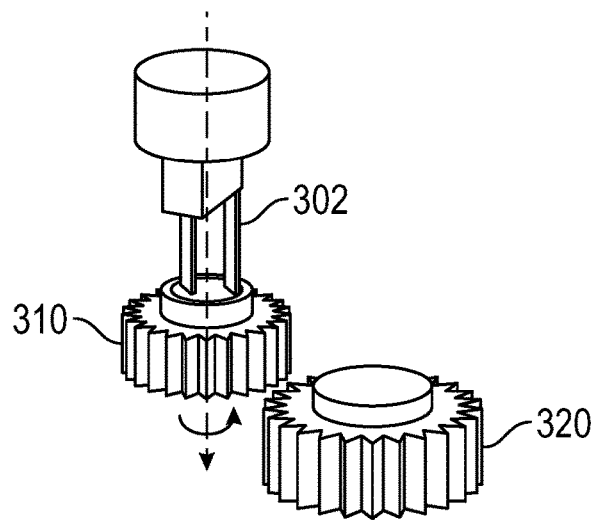
FIG. 3 is an illustration of parts being robotically assembled, where the parts require alignment in a manner which causes the robot to perform a phase search to find a proper rotational orientation about the insertion axis.

FIG. 3 is an illustration of parts being robotically assembled, where the parts require alignment in a manner which causes the robot to perform a phase search to find a proper rotational orientation about the insertion axis. A gripper 302 grasps a first part 310 which must be mated with a second part 320. In this case, the first and second parts 310/320 are gears having teeth which must be precisely aligned. In order to find the proper alignment of the part 310 with respect to the part 320, the robot may be required to perform a phase search, where the gripper 302 finely adjusts the rotational position of the part 310 about its pivot axis while attempting to lower the part 310 into position and engagement with the part 320.

Although the hole search and phase search capabilities described above exist in robotic systems, they can be inefficient, and they are often ineffective when the part assembly involves anything more complex than a simple hole alignment or rotational alignment.

In order to make assembly tasks robust to these inevitable positional uncertainties, robotic systems typically utilize force control based functions to "feel" for the proper part fit. A traditional way to set up for robotic assembly tasks is by manual tuning, where a human operator programs a real robotic system for the assembly task, runs the program, and adjusts force control parameters in a trial and error fashion. However, tuning and set up of these force control functions using physical testing is time consuming and expensive due to the manual trial and error which has to be performed. Parameter tuning on real physical test systems is also dangerous, since robots are not compliant, and unexpected contact may damage robots or surrounding fixtures or structures.

Systems exist for tuning force control parameters for robotic assembly in a simulation environment, but these existing systems exhibit several limitations. Some of these systems are designed to simulate only one specific type of assembly task—such as one of those shown in FIGS. 1-3—and cannot be applied to general assembly tasks because the techniques include pre-programmed motion strategies which are specific to the particular type of assembly task. Other existing systems for parameter tuning in a simulation environment still require significant human experience and expertise for guiding the selection of force control parameters used in the simulations.

The present disclosure describes a method for autonomously tuning the force control parameters for a generic robotic assembly which overcomes the limitations of existing techniques. The method uses a high-fidelity closed loop force control simulation of the robot with contact dynamics between the parts being assembled. The assembly task is segmented and parameterized, and an optimization routine evaluates the simulations to find the parameter values which exhibit the best assembly performance. Each evaluated parameter set is simulated multiple times with randomly varying part pose uncertainty, and the parameter sets which are most robust to the pose uncertainty are rated the highest. The technique is discussed in detail below.

Figure 4:
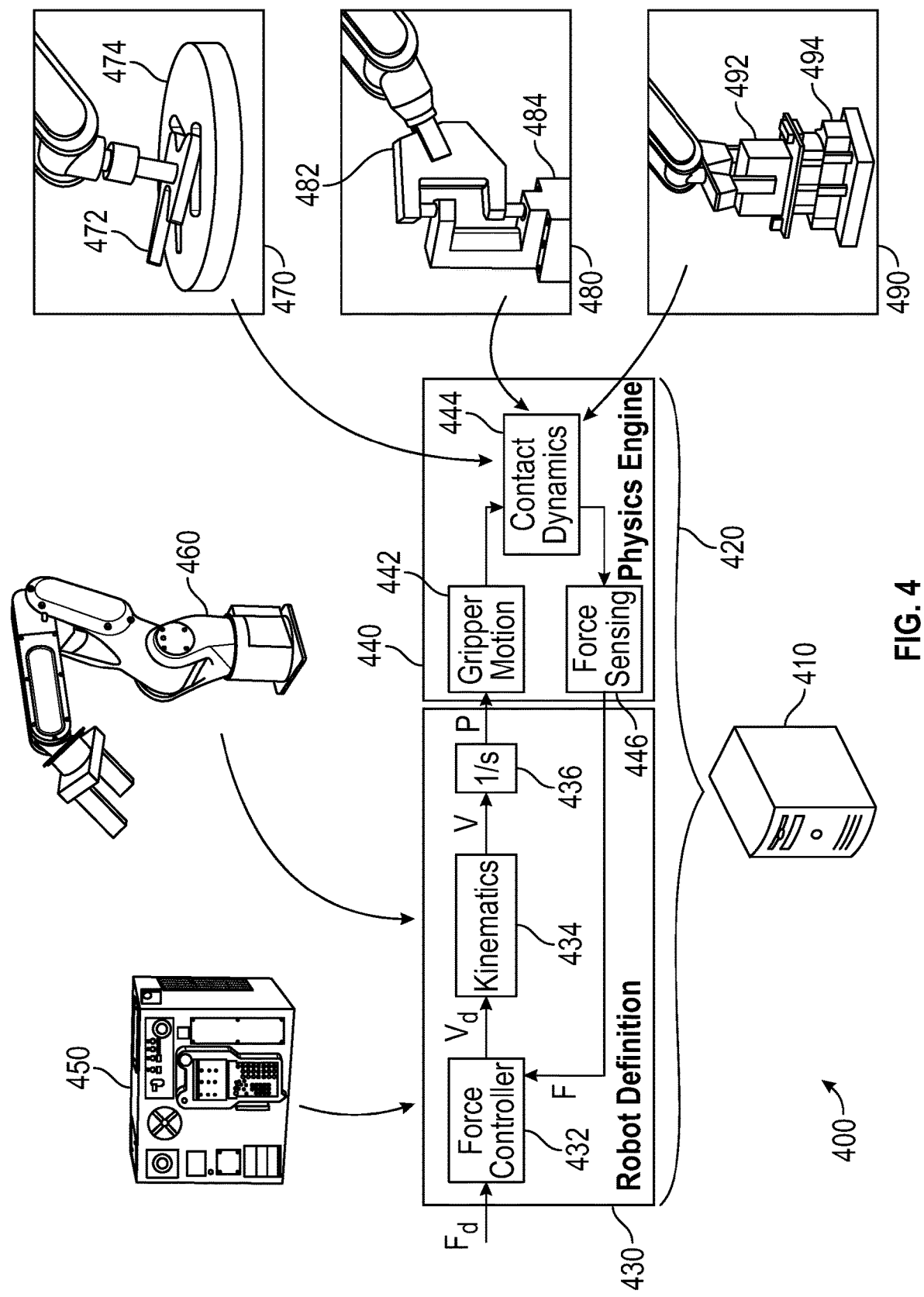
FIG. 4 is a block diagram illustration of a simulation system configured for feedback control simulation of a robotic assembly operation, including the ability to determine the effectiveness of given force control parameters, according to an embodiment of the present disclosure.

FIG. 4 is a block diagram illustration of a simulation system 400 configured for feedback control simulation of a robotic assembly operation, including the ability to determine the effectiveness of given force control parameters, according to an embodiment of the present disclosure. A computer 410 is configured to run a simulation system 420 including a robot definition model 430 and a physics engine 440. The simulation system 420 performs a closed-loop force control simulation of an assembly operation, including contact dynamics between the parts being assembled in the simulation. The simulated assembly operation behaves in accordance with force control parameters which are defined as inputs to the robot definition model 430. Examination of the results of each simulation (were the parts fully and properly assembled?) enables the evaluation of the effectiveness of different values of the force control parameters.

The robot definition model 430 includes a force controller 432. Unlike robot controllers which are used for motion control applications such as spray painting, laser welding, or part placement on a conveyor (where contact between the robot end-of-arm tool and the environment is rigorously avoided), the force controller 432 provides compliant motion of the robot based on resistance encountered when contacting other objects. This is done using a form of admittance control.

Impedance control (or admittance control) is an approach to dynamic control relating force and position. It is often used in applications where a manipulator interacts with its environment and the force-position relation is of concern. Mechanical impedance is the ratio of force output to motion input. A virtual mass-spring-damping system is employed to define these relationships. Controlling the impedance of a mechanism means controlling the force of resistance to external motions that are imposed by the environment. Mechanical admittance is the inverse of impedance—it defines the motions that result from a force input. The theory behind the impedance/admittance control method is to treat the environment as an admittance and the manipulator as an impedance.

The force controller 432 operates as described above, and receives as input a target (or "desired") force $F_d$ and provides as output a resultant motion (velocity) $V_d$. The variables $F_d$ and $V_d$ are vectors including all six degrees of freedom (three translational and three rotational) in Cartesian space. The force controller 432 computes the resultant motion $V_d$ using the admittance control calculations described above, based on the difference between the target force $F_d$ and an actual contact force F applied to the workpiece. The force/torque balance and motion calculations are typically performed about the workpiece center of gravity. The relationship between $F_d$ and $V_d$ and the tuning of $F_d$ to achieve efficient assembly are discussed further below.

As stated above, the resultant motion $V_d$ provided as output of the force controller 432 is a Cartesian velocity vector including all six degrees of freedom of motion (three translational velocities and three rotational velocities) of the part center of gravity. A kinematics block 434 computes corresponding robot joint velocities V needed to cause the end-of-arm tool (gripper) to move the part center of gravity with the velocity $V_d$. The kinematics block 434 performs the joint velocity calculations based on known robot kinematics, using an inverse kinematic calculation, as known in the art. In addition to converting the target velocity $V_d$ in Cartesian space to V in joint space, the kinematics block 434 also includes a low pass filter to ensure smoothness and feasibility of the target velocity in joint space output as V. An integral block 436 integrates joint velocity V to obtain a joint position vector P, which defines a robot pose in simulation, resulting in a defined gripper motion.

Known characteristics and capabilities of a robot controller 450 are used to simulate the force controller 432, the inverse kinematics computations in the block 434 and the integration in the block 436. Known characteristics of a specific robot 460 (kinematics, motor torque/speed characteristics) are also used to build the robot definition model 430.

The physics engine 440 simulates the physical interaction of the parts which are being robotically assembled. The robot motions defined by the joint position vector P are provided at block 442, and are used in a contact dynamics model 444 to simulated the contact between the parts. Three different part assembly examples are shown to the right of FIG. 4, illustrating examples of simulations which have been run and successfully demonstrated the disclosed autonomous parameter tuning method.

In box 470, a complex planar part 472 is robotically inserted into a mating aperture in a fixed part 474. In box 480, a two-peg part 482 is robotically inserted into a mating two-hole fixed part 484. In box 490, an electrical connector 492 (e.g., male connector) is robotically inserted into a mating fixed electrical connector 494 (e.g., female connector). These examples demonstrate assembly operations performed on very different types of parts, where all of the examples are sensitive to translational position alignment in both lateral directions, and the examples exhibit different sensitivities to rotational position about a vertical axis (phase) and tilt position of the vertical axis. Thus, each type of assembly will be expected to perform optimally using different force control parameters in the force controller 432. It is the autonomous tuning of the force control parameters that is provided by the techniques of the present disclosure.

For any given part assembly operation being simulated, CAD models of the parts are provided to the contact dynamics model 444. For example, to run simulations of the parts shown in the box 480, a CAD model of the two-peg part 482 and a CAD model of the two-hole part 484 are provided. The two-peg part 482 is grasped in the robot gripper in a known pose relative to the robot, and the two-hole part 484 is fixed in the 3D simulation space. The exact position and orientation of the fixed two-hole part 484 in the 3D simulation space will be varied from nominal in order to simulate the real world uncertainties discussed earlier.

The contact dynamics model 444 in the physics engine 440 simulates the movement of the part in the robot gripper (e.g., the part 482) based on the robot motion from the block 442. When the part in the robot gripper (e.g., the part 482) contacts the fixed part (e.g., the part 484) in simulation space, the resulting contact forces and torques from the contact dynamics model 444 are provided to a force sensing block 446, where they are in turn provided as feedback force F to the force controller 432. The feedback force F, like the target force $F_d$, is a 6×1 vector including three forces and three torques—that is, all six coordinate directions of the 3D simulation space. When the tuned force control parameters are used in a real world robotic assembly operation (see FIG.

9), the contact forces and torques are provided by a force sensor which is fitted to the robot gripper.

The simulation system 400 of FIG. 4 provides realistic simulation of a force controller robotic system performing an assembly operation of two geometrically-defined parts. The success of the simulated assembly operation depends on the force control parameters defined as input to the force controller 432. The simulation system 400 can then be used in a recursive optimization computation to autonomously tune the force control parameters for successful assembly, including randomly varying the positional uncertainty of the fixed part to better simulate real world conditions.

Figure 5:
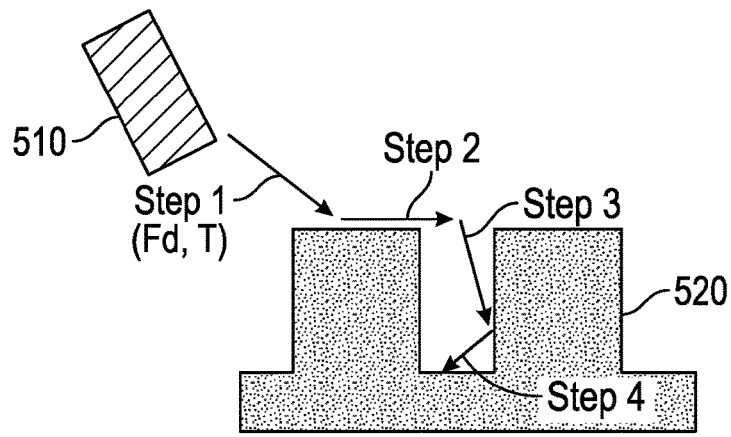
FIG. 5 is a cross-sectional illustration of a robotic assembly operation which depicts the assembly steps and force control parameters used in the simulation system of FIG. 4, according to an embodiment of the present disclosure.

FIG. 5 is a cross-sectional illustration of a robotic assembly operation which depicts the assembly steps and force control parameters used in the simulation system of FIG. 4, according to an embodiment of the present disclosure. In order to search for the best assembly program using numerical optimization, the assembly program is parameterized. The parameterization can be designed in any suitable manner by the user. One way to perform parameterization is to divide the assembly program into multiple steps of compliant control. In one exemplary embodiment, four steps are used. The target or desired force $F_d$ is provided as input to the force controller in the form of a 6×1 vector for each of the assembly steps. For each step, the robot gripper velocity (in Cartesian coordinates) can be determined by $V_d$, $F_d$, $F$, $D$ where F is the feedback contact force (also a 6×1 vector) described above, and D is a force controller gain matrix. D is a 6×6 matrix, and in a preferred embodiment is a diagonal matrix. The velocity calculation can be written in matrix multiplication form (eliminating matrix division) as $V_d=\text{inv}(D)\cdot(F_d-F)$.

In a preferred embodiment, the force controller gain matrix D and execution time T of each step are fixed as constants, and the target force vector $F_d$ is the parameter which is optimized. However, in other embodiments, D and T could be parameters which are variable and are optimized. Based on the target or desired force vector $F_d$ which is provided as input to the force controller for each step, the robot will move with velocity $V_d=\text{inv}(D)\cdot(F_d)$ if the part in the robot gripper is not contacting the environment; otherwise the robot will maintain contact force $F=F_d$.

In the scenario of FIG. 5, a peg 510 is to be inserted into an aperture in a hole part 520. The hole part 520 is fixed in position, and the peg 510 is manipulated by a robot (not shown). Suppose there are four steps in the assembly program, as shown in the illustration of FIG. 5. For each step i, the target force vector $F_d^i$ is provided as input, and that target force vector $F_d^i$ is maintained for a time duration T while the robot attempts to move the peg 510 into its assembled position. At the end of the step (after the time duration T), the target force vector $F_d^{i+1}$ is provided for the step i+1, and this repeats for all four steps, with each step running for the time duration T.

The initial values to use in the target force vector $F_d^i$ (to initiate the optimization, which will then tune $F_d^i$ for best results) can be selected as follows. Consider a case where the peg 510 is nominally directly above the aperture in the hole part 520, where the positive z axis of the workspace coordinate frame is directed upward. In this case, the travel distance of each step (stepDist) is determined by dividing the initial peg-hole distance by four (for four steps), and adding a small value (such as 2%). Then the target velocity vector of each step ($V_d^i$) is calculated as $$V_d^i = \left[0, 0, -\frac{stepDist}{T}, 0, 0, 0\right]^T.$$

That is, the target velocity vector is vertically downward (in the negative z direction), with no x, y or rotational components. The target force for step i is then calculated, using the equation described above, as $F_d^i = D \cdot V_d^i$.

As discussed earlier, $F_d^i$ and $V_d^i$ are both 6×1 vectors (force and velocity in all six Cartesian DOF). When $F_d^i$ is provided for a number of assembly steps N (such as N=4), the assembly path becomes $\theta = \{F_d^1, F_d^2, \ldots, F_d^N\}$, where each of the vectors $F_d^i$ is computed as described above. The assembly path $\theta$, along with the time step duration T, are the inputs to the robot force controller.

The preceding discussion describes how the target force vector $F_d^i$ is initially defined for the simulated assembly process of FIG. 5. A statistical distribution (variance) is also defined for the values of the target force vector $F_d^i$. Optimization is then used over many simulated assembly operations to tune the target force vector parameters to achieve robust assembly success in the presence of random pose errors.

Figure 6:
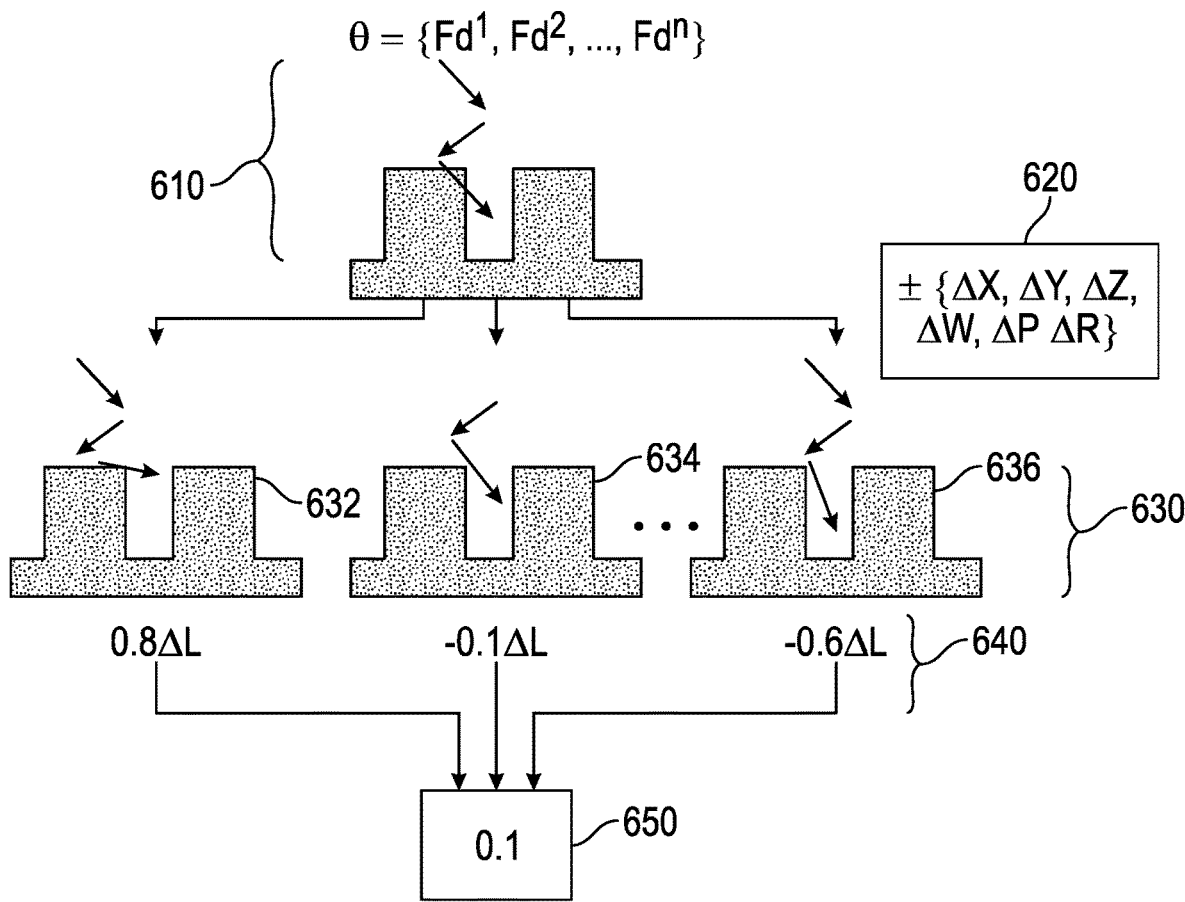
FIG. 6 is a cross-sectional illustration of the robotic assembly operation of FIG. 5, where the operation is simulated multiple times using a range of part positioning variation, and each simulation is evaluated using a cost function, according to an embodiment of the present disclosure.

FIG. 6 is a cross-sectional illustration of the robotic assembly operation of FIG. 5, where the operation is simulated multiple times using a range of part positioning variation, and each simulation is evaluated using a cost function, according to an embodiment of the present disclosure. At 610, an assembly process is defined as discussed above with respect to FIG. 5—including a fixed part, a part grasped by a robot and to be assembled with the fixed part, and a target force assembly path $\theta = \{F_d^1, F_d^2, \ldots, F_d^N\}$. A range of pose errors 620 are then defined, to account for part positioning variations of the types discussed with respect to FIG. 1. For example, in one application, the part positioning uncertainty may be defined as +/−3 mm, and the part orientation uncertainty may be defined as +/−2°. Higher or lower values may of course be used, as appropriate.

At 630, multiple assembly simulations are performed, each using the same target force assembly path $\theta = \{F_d^1, F_d^2, \ldots, F_d^N\}$, and each simulation using different pose errors 620 chosen from the part positioning uncertainty ranges. The pose errors 620 are applied to the position of the fixed part relative to its nominal position in the workspace coordinate frame. The pose errors 620 may be defined as "delta" values in all six degrees of freedom, such as {Δx, Δy, Δz, ΔW, ΔP, ΔR}, where W, P and R are yaw, pitch and roll, respectively. In this way, multiple simulations are performed. A simulation 632 uses the target force path $\theta$ and one set of pose errors chosen from the uncertainty ranges (such as {Δx=0.5, Δy=−1.3, Δz=1.7, ΔW=−0.9, ΔP=1.9, ΔR=0.1}). A second simulation 634 uses the same target force path $\theta$ and a different set of random pose errors chosen from the part positioning uncertainty ranges (such as {−1.5, −0.6, 1.1, 0.6, 1.2, −0.7}). A third simulation 636 uses the same target force path $\theta$ and yet another set of random pose errors, and so forth. The number of simulations using the same target force path and different random pose errors may be chosen to suit the application. In one non-limiting example, the number of simulations at 630 is in a range of five to ten. Only three pose error simulations are shown in FIG. 6 simply for the sake of clarity.

Each of the simulations at 630 ends with a final assembly pose error after the last step. In the case of a peg and hole assembly, the final pose error could be the 3D distance between the bottom tip of the peg and the target location at the bottom of the hole. It is desirable for this distance, the final pose error, to be minimized. If the force controller successfully inserts the peg in the hole and lowers the peg, the final pose error will be very small (such as less than one mm). However, if the force controller fails to insert the peg into the hole (for example, sliding the tip of the peg off the side of the hole part), then the final pose error will be large (such as 20 mm). Shown at 640, a cost function is computed for the final pose error for each of the simulations at 630. The cost function value may be simply the final pose error in physical distance units, or may be normalized to a part size, for example. In any case, a low cost function value indicates a successful simulated assembly.

At box 650, an average cost function value is computed for all of the simulations at 630. For example, if five simulations are run, each using the same target force path $\theta$ and different values of the random pose errors, then the average cost function for the five simulations is computed at the box 650. The average cost function is an indicator of how well the simulated assembly performs using the input target force path $\theta$ (including the parameterized target force values). This cost function value is later used in an optimization process to autonomously tune the parameterized target force values.

Figure 7:
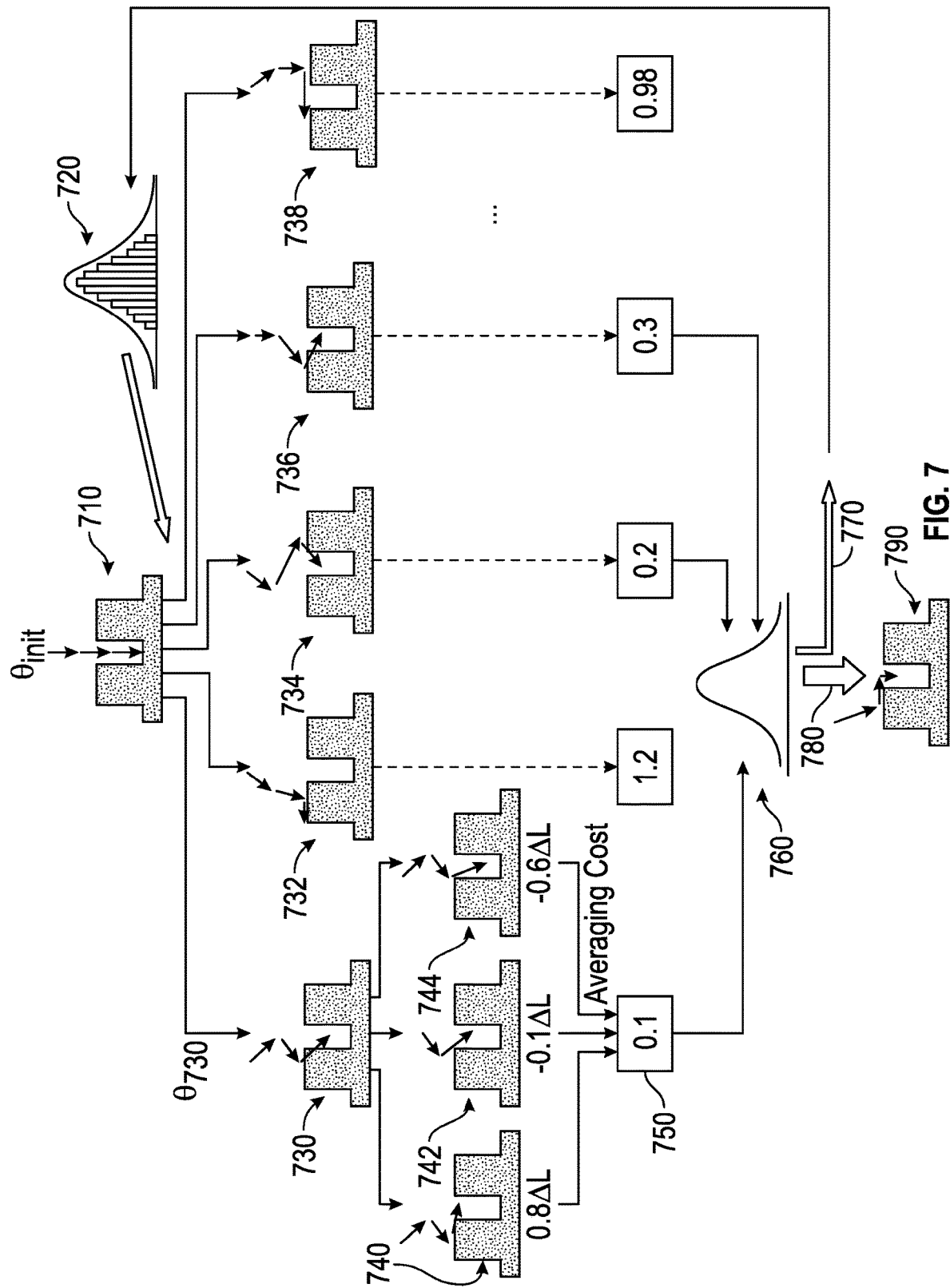
FIG. 7 is a cross-sectional illustration of the robotic assembly operation of FIGS. 5 and 6, where several groups of simulations evaluate part positioning variation as in FIG. 6, each of the groups uses different values of force control parameters from a distribution, and the distribution is updated in an optimization process to find optimal values of the parameters, according to an embodiment of the present disclosure.

FIG. 7 is a cross-sectional illustration of the robotic assembly operation of FIGS. 5 and 6, where several groups of simulations evaluate part positioning variation as in FIG. 6, each of the simulation groups or sets uses different values of force control parameters from a distribution, and the distribution is updated in an optimization process to find optimal values of the parameters, according to an embodiment of the present disclosure. An initial target force path $\theta$ is defined at 710, in the manner described above with respect to FIG. 5. In the case of perfectly aligned parts (absence of any pose errors), the peg would descend directly into the hole as shown at 710. However, because of part positioning uncertainties, the perfect alignment of the robotically-manipulated part with the fixed part is extremely unlikely, and the force control parameters must therefore be selected to be robust to part pose errors.

A statistical distribution 720 is defined for the parameterized values in the target force path $\theta$. In one example, the statistical distribution 720 is a Gaussian or normal distribution. Other types of distributions may be defined as appropriate. Values of the target force path $\theta$ are selected at random from the statistical distribution 720, and a different target force path $\theta$ is used for each of a simulation set 730, 732, ... 738. The number of simulation sets may be chosen to suit the application; five are shown in FIG. 7 merely for illustrative purposes. For each of the simulation sets 730-738, multiple assembly simulations are performed, each simulation using different pose errors 610 chosen from the part positioning uncertainty ranges as described with respect to FIG. 6. Each target force path $\theta$ is comprised of a 6×1 target force vector $F_d^i$ for each of the steps (e.g., four).

Consider for example the simulation set 730. The simulation set 730 uses a target force path $\theta_{730}$ which is selected at random from the statistical distribution 720. The simulation set 730 includes simulations 740, 742 and 744 (and probably more, not shown). Each of the simulations 740, 742 and 744 uses the same target force assembly path $\theta_{730}$, and each simulation uses different pose errors chosen from the part positioning uncertainty ranges. An average cost function value 750 is computed for all of the simulations in the simulation set 730, as discussed above with respect to FIG. 6. The average cost function value 750 is an indicator of how well the assembly operation performs, in the presence of part positioning uncertainty, using the target force path $\theta_{730}$. Each of the other simulation sets 732-738 is evaluated in the same manner, where each simulation set produces an average cost function value.

The best performing simulation sets (those with the lowest cost function value) are selected and used in an optimization algorithm to define a new statistical distribution 760 for the target force path $\theta$. In one non-limiting example, the three best simulation sets are selected—shown as the simulation sets 730, 734 and 736 in FIG. 7. The values of the best-performing target force assembly paths ($\theta_{730}$, $\theta_{734}$, $\theta_{736}$) are used to define the new statistical distribution 760. If the statistical distribution 760 does not meet a convergence criteria relative to quality of the assembly results, then at arrow 770 the new statistical distribution 760 is used to replace the statistical distribution 720, and new simulation sets are defined. This process continues recursively until the convergence criteria are met at arrow 780. The final mean values ($\theta_{final}=\{F_d^1, F_d^2, \ldots, F_d^N\}$) of the statistical distribution 760 are output at 790, and these force control parameters $\theta_{final}$ are known to provide robust robotic assembly of the parts in the presence of part positioning uncertainty.

Figure 8:
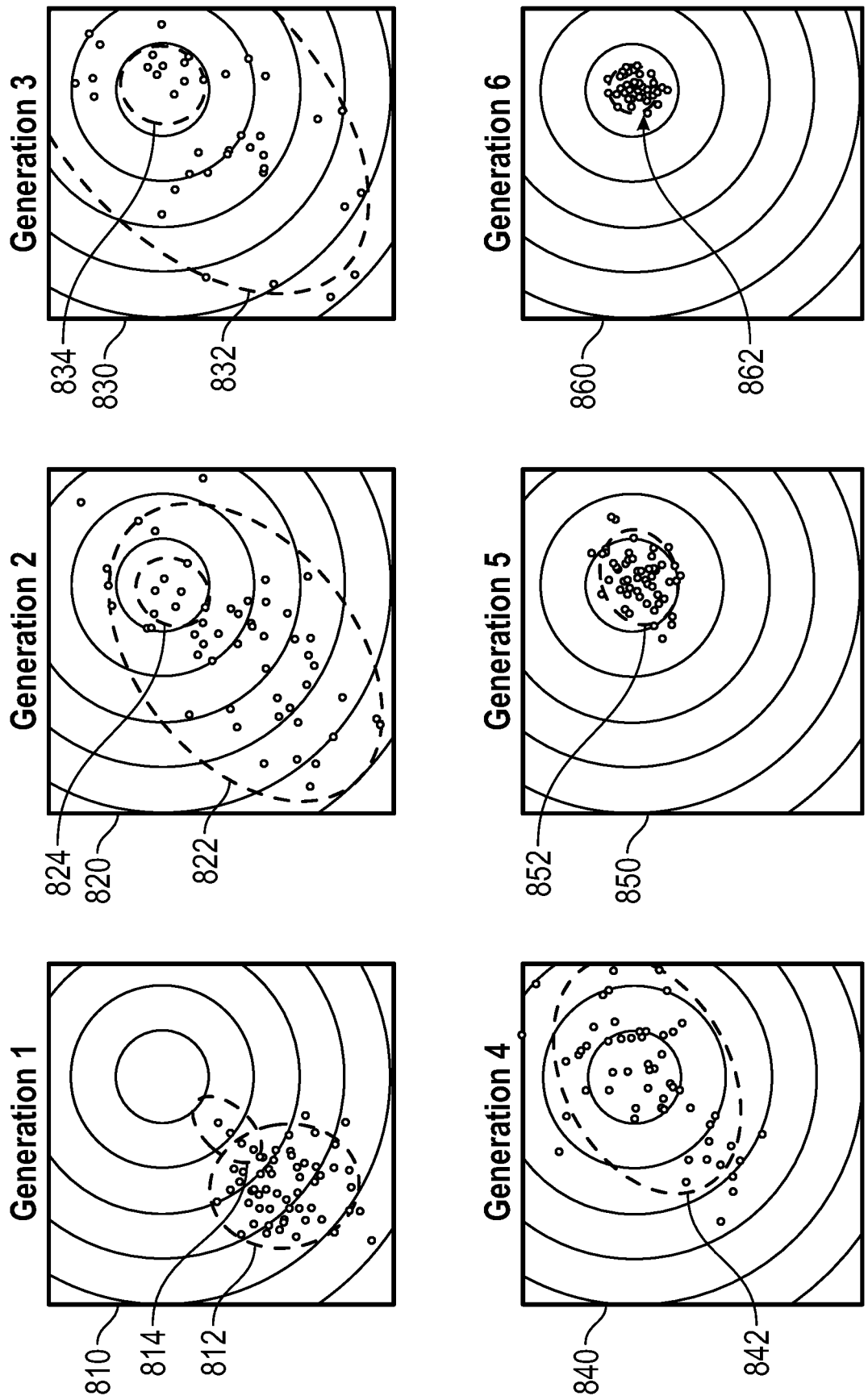
FIG. 8 is a conceptual illustration of parameter searching and convergence in a two-dimensional space using numerical optimization, as known in the art.

FIG. 8 is a conceptual illustration of parameter searching and convergence in a two-dimensional space using numerical optimization, as known in the art. A numerical optimization algorithm can be used to automatically tune parameters to achieve best results. One example is Covariance Matrix Adaptation Evolution Strategy (CMA-ES), for which a set of parameters are sampled from a distribution (e.g., Gaussian), and each of them are evaluated (using simulation). The Gaussian distribution is then updated in a directional optimization fashion to increase the probability to sample well-performing parameters.

Box 810 shows an initial (first generation) set of individual parameter samples from a 2D distribution 812, where each sample is represented by a dot. It is to be understood that the directional optimization technique depicted in FIG. 8 is applicable to multiple dimensions; the approach is shown in two dimensions for visual clarity. Each of the samples from the distribution 812 is used in a simulation which results in a performance metric (such as the cost function value described above). The samples contained in a region 814 had the best performance of all of the samples in the distribution 812. Based on this, a second generation of parameter samples is created at box 820, having a distribution 822. The distribution 822 is enlarged and elongated in the direction of the best performing samples by the CMA-ES algorithm. The samples from the distribution 822 are used in simulations, which results in a performance metric for each. The samples contained in a region 824 had the best performance of all of the samples in the distribution 822.

At box 830, a third generation of parameter samples is created, having a distribution 832. The distribution 832 is further enlarged and elongated in the direction of the best performing samples from the region 824. The samples from the distribution 832 are used in simulations, and the samples in a region 834 are found to have the best performance. The directional optimization process continues for a fourth generation at a box 840, where a distribution 842 is smaller and essentially concentric with the distribution 832, because the best performing region 834 was essentially centered within the distribution 832. In other words, the distribution 842 has about the same mean values as the distribution 832, but a smaller standard deviation. A fifth generation of samples at box 850 has a distribution 852 with about the same mean and an even smaller standard deviation in comparison to the fourth generation. A sixth generation of samples at box 860 has a distribution 862 with about the same mean and an even smaller standard deviation in comparison to the fifth generation, and the distribution 862 is deemed to have met the convergence criteria.

The directional optimization process shown in FIG. 8 clearly illustrates how the optimization algorithm is applied to the simulations of FIG. 7—defining an initial parameter distribution (for the target path θ including values for the target force vector $F_d^i$ at each step), running a plurality of simulation sets, selecting the simulation sets having the best performance to define a new parameter distribution, and continuing this process until the convergence criteria are met. Covariance Matrix Adaptation Evolution Strategy (CMA-ES) is one preferred optimization technique, and was used in the development of the presently disclosed methods. However, other optimization solutions could also be employed, including Particle Swarm Optimization, and Bayesian Optimization.

Figure 9:
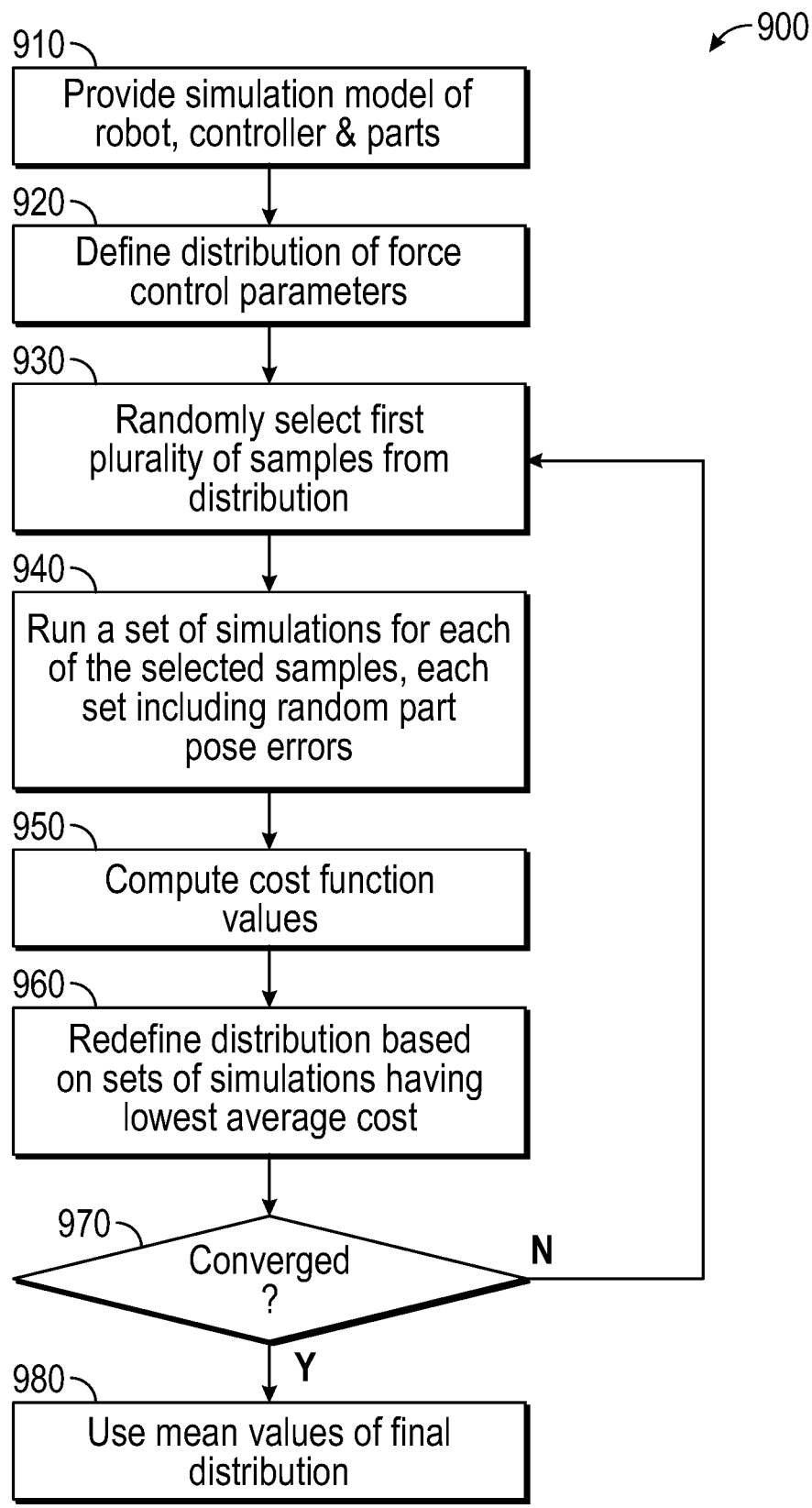
FIG. 9 is a flowchart diagram of a method for autonomous parameter tuning for a general robotic assembly operation using numerical optimization combined with physical simulation, according to an embodiment of the present disclosure.

FIG. 9 is a flowchart diagram 900 of a method for autonomous parameter tuning for a general robotic assembly operation using numerical optimization combined with physical simulation, according to an embodiment of the present disclosure. At box 910, a simulation model of a robot with a force controller, and solid models of parts being assembled, are provided. This step was described in detail in the discussion of FIG. 4. At box 920, a statistical distribution of force control parameters is provided, including nominal values and standard deviations. This includes the 6×1 target force vector $F_d^i$ for each step in the assembly simulation—as discussed earlier with respect to FIGS. 5-7. At box 930, a first plurality of samples from the distribution is randomly selected. In one embodiment, the first plurality is in a range of five to ten samples.

At box 940, a set of simulations for each of the selected samples is run, where each set of simulations includes a second plurality of simulations. Each simulation in a set of simulations uses the same selected sample of force control parameters, and different randomly assigned values of part pose error. In one embodiment, the second plurality is in a range of five to ten simulations. Thus, one set of simulations includes five to ten simulations, each simulation using the same selected sample of force control parameters, and each simulation using a different part pose error. At box 950, a cost function value is computed for each of the simulations, along with an average cost function value for each set of simulations. The cost function value for each simulation is computed based on a distance error between a final part position after simulation and a target position.

At box 960, the statistical distribution of force control parameters is redefined based on a quantity of the sets of simulations having lowest values of the average cost function value. In one embodiment the three sets of simulations having the best performance (of the five to ten sets) are selected, and the distribution is redefined based on the force control parameters used in those three sets. The redefinition of the parameter distribution is controlled by the optimization algorithm. At decision diamond 970, it is determined whether a convergence criteria has been met. The convergence criteria could be based on the amount of change from one distribution to the next, or the criteria could be based on the rate of successful assembly simulations.

When the convergence criteria is not met at the decision diamond 970, the directional optimization algorithm returns to the box 930 to randomly select samples from the redefined distribution, followed by running the sets of simulations and again redefining the distribution until the convergence criteria is met. When the convergence criteria is met, mean values of a final distribution are used as optimal values of the force control parameters. The optimal values of the force control parameters are provided to a real robot controller to be used in real world robotic assembly operations corresponding to the simulated assemblies which were performed.

Figure 10:
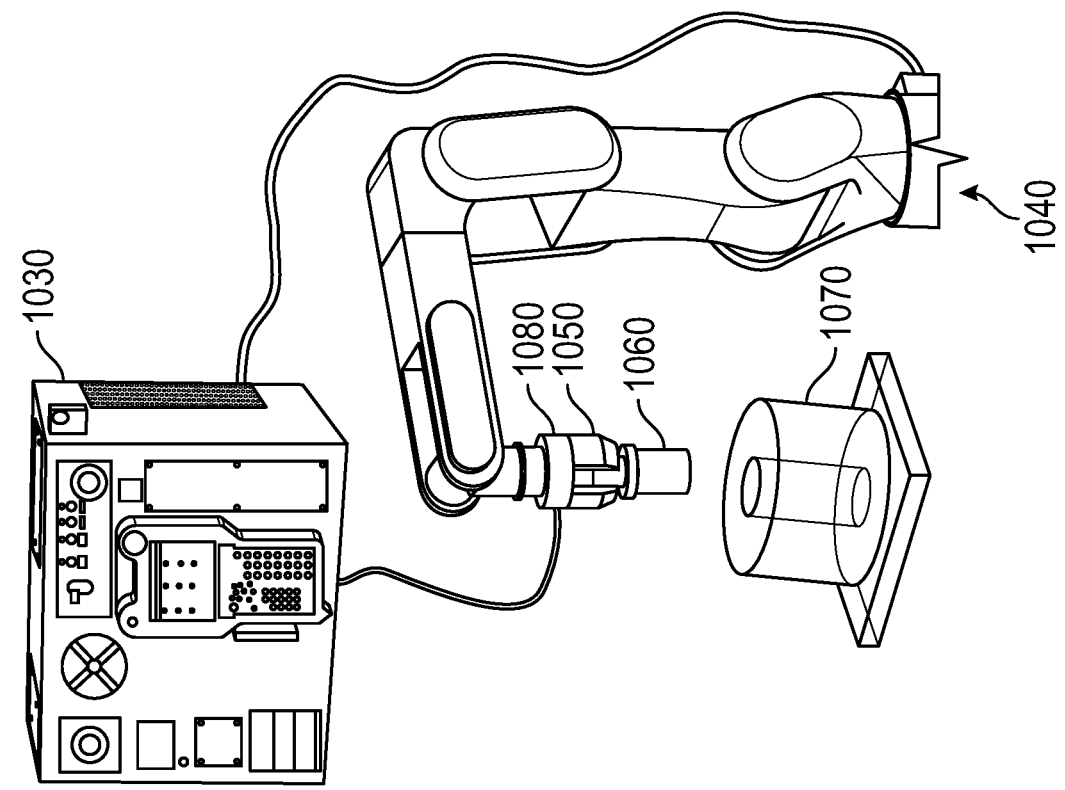
FIG. 10 is an illustration of a system for autonomous parameter tuning via the method of FIG. 9, where the tuned parameters are used by a robot controller in a corresponding real world robotic assembly operation, according to an embodiment of the present disclosure.
Figure 10:
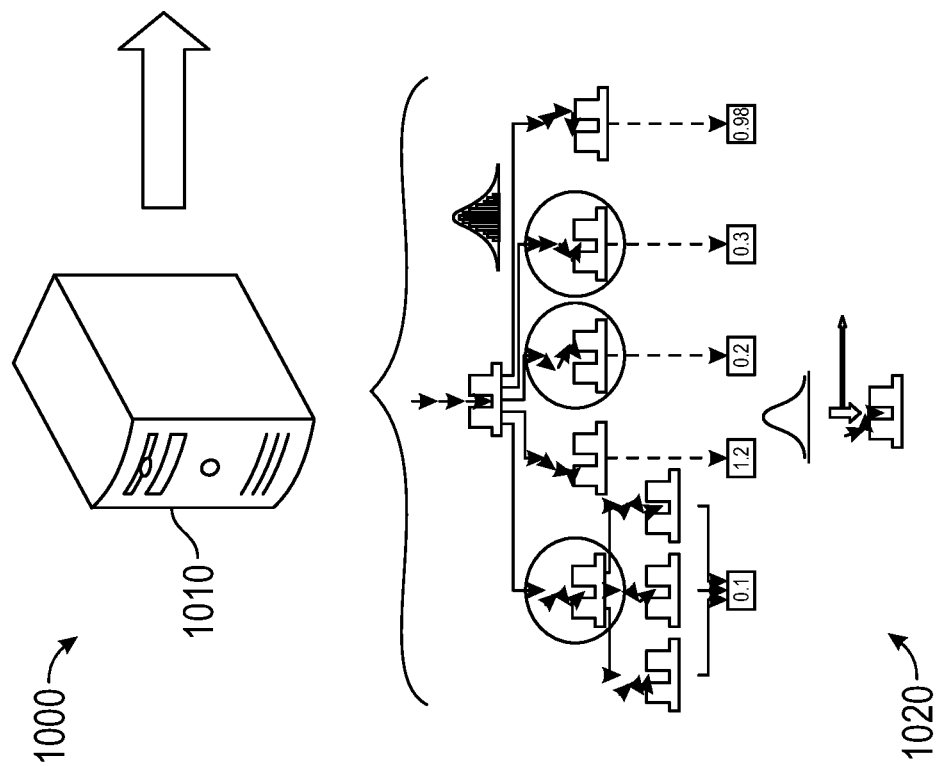

FIG. 10 is an illustration of a system 1000 for autonomous parameter tuning via the method of FIG. 9, where the tuned parameters are used by a robot controller in a corresponding real world robotic assembly operation, according to an embodiment of the present disclosure. A computer 1010 has a processor and memory configured with an algorithm to perform the autonomous parameter tuning method of FIG. 9. Box 1020 illustrates that the computer 1010 runs the simulation and optimization computations of FIG. 7, including the simulation of robotic assembly described with respect to FIGS. 4-6. This includes using an optimization solver to find values of force control parameters which provide optimal part assembly performance in the presence of part positioning uncertainty.

After the parameter optimization simulations have converged, the optimal values of the force control parameters are provided from the computer 1010 to a robot controller 1030. The controller 1030 controls a robot 1040 which is tasked with performing the assembly operation which was simulated and optimized on the computer 1010. In the example shown, the robot 1040 includes a gripper 1050 which grasps a peg part 1060, where the peg part 1060 is to be inserted into a hole part 1070. In one common embodiment, the robot 1040 is a six-axis articulated robot. A force/torque sensor 1080 is coupled between an outer arm of the robot 1040 and the gripper 1050. The force/torque sensor 1080 provides a feedback force/torque signal to the controller 1030, so that the force controller calculations can be carried out as discussed with respect to FIG. 4.

The robot 1040 operates in a workspace having a fixed coordinate frame. The controller 1030 knows the position and orientation of the gripper 1050 and the grasped part 1060 at all times based on robot kinematics and joint state data. The hole part 1070 is held fixed in a jig or fixture, and has a position and orientation in the fixed coordinate frame which are known within a certain degree of precision. As discussed above, after the simulations on the computer 1010, the controller 1030 is configured with force control parameters which are optimized to enable robust assembly of the parts 1060/1070 by the robot 1040, even in the presence of variation of the fixtured pose of the part 1070, variation of the grasped pose of the part 1060, etc.

The techniques described above have been tested using three part assembly simulations as shown in FIG. 4: complex shaped planar part insertion, dual peg-hole insertion, and electrical connector insertion. In each case, the assembly success rate with tuned parameters (using the disclosed techniques) exceeded the success rate without tuning, and in many cases the improvement was dramatic (>90% success with parameter tuning vs. <20% without tuning). Two of the part assembly operations (dual peg-hole insertion, and electrical connector insertion) were also tested using real robots and parts, where the robot controllers were configured with the tuned force control parameters. These real-world experiments verified the ability of the controller and robot to efficiently assemble the parts, even in the presence of part positioning uncertainty.

The autonomous parameter tuning technique disclosed above offers several advantages over existing methods. Unlike parameter optimization techniques which use real-world experiments, simulation can be done much faster on computers. Another benefit is that simulation is easy to reset for every trial, whereas in real-world experiments it is time-consuming to reset the robot and controller, especially when the previous trial fails. Furthermore, executing robots to do contact-rich tasks repeatedly could damage the workpieces, especially with parameters which are not well-tuned. Also, workpieces are easily worn during contact, which could introduce model differences between beginning trials and later trials during parameter learning. In contrast, in the simulated environment, simulation trials won't cause any damage to workpieces or robots. Parameter tuning using simulation also doesn't create any safety issues for human workers.

In addition, the disclosed techniques operate autonomously, requiring only a model of the controller and robot, and solids models of the parts being assembled. No expert person is required to "guide" the simulations to find the proper solution. Rather, the combination of simulation and optimization, with part positioning uncertainty included in the selection of force control parameters, automatically finds optimal values of the parameters based on the actual part assembly contact dynamics. For example, the two-peg part assembly will autonomously converge on force controller translational and rotational gains which are much different than those which are selected for the electrical connector assembly operation.

It is noted that more or different parameters may be evaluated and optimized for certain part assembly applications. The parameters discussed above—which are all related to the input target force values used in the assembly process—are simply one preferred embodiment. The same type of optimization routine could be used with the same physical simulation model to optimize values of other parameters, such as stiffness and damping values used in contact dynamics, or other parameters used in the compliance controller.

Throughout the preceding discussion, various computers and controllers are described and implied. It is to be understood that the software applications and modules of these computers and controllers are executed on one or more computing devices having a processor and a memory module. In particular, this includes a processor in the robot controller 1030 which controls the robot 1040 performing the robotic assembly task as shown in FIG. 10, and the computer 410 (FIG. 4) and the computer 1010 (FIG. 10) with one or more processors configured to run the autonomous parameter tuning method for a robotic assembly operations using numerical optimization combined with physical simulation as discussed above.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for autonomously tuning controller parameters for a robotic assembly operation in which a robot manipulates a first part into an assembled position with a second part, said method comprising:
   initializing a distribution of the controller parameters to be tuned;
   providing a plurality of random samples of the controller parameters from the distribution;
   running a set of simulations of the assembly operation for each of the samples in the plurality, on a computer having a processor and memory, the simulations including a compliance controller model of a robot performing the assembly operation, where each set of simulations includes a plurality of simulations each using a different fixed pose deviation of the second part;
   computing a cost function value for each of the simulations, and an average cost function value for each of the sets of simulations; and
   running a numerical optimization to optimize values of the controller parameters, including;
   redefining the distribution of controller parameters based on a quantity of the sets of simulations having the lowest average cost function values;
   returning to providing the first plurality of random samples of the controller parameters from the distribution as redefined when the numerical optimization has not converged, and
   using mean values of the distribution of controller parameters as the final tuned parameters when the numerical optimization has converged.

2. The method according to claim 1 wherein initializing a distribution of controller parameters includes defining a normal distribution with a mean and a standard deviation for each of the parameters.

3. The method according to claim 1 wherein the controller parameters to be tuned include an input target force vector to the compliance controller model, in six degrees of freedom, for each step in a multi-step assembly path.

4. The method according to claim 1 wherein the simulations include the compliance controller model which computes robot motions based on a difference between an input target force vector and a feedback contact force vector.

5. The method according to claim 4 wherein the simulations include contact dynamics between the first and second parts using solid models of the parts, and the feedback contact force vector is computed from the contact dynamics.

6. The method according to claim 1 wherein the fixed pose deviation of the second part is chosen randomly from a range of pose deviations, and includes a combination of three orthogonal position deviations and three orthogonal orientation deviations.

7. The method according to claim 1 wherein the cost function value is computed based on a final assembled position error after each simulation, where a lower cost function value designates a smaller final assembled position error.

8. The method according to claim 1 wherein the numerical optimization has converged when a percentage of the simulations meeting a maximum cost function value criteria exceeds a predefined threshold.

9. The method according to claim 1 wherein running a numerical optimization includes using Covariance Matrix Adaptation Evolution Strategy (CMA-ES) Optimization, Particle Swarm Optimization, or Bayesian Optimization.

10. The method according to claim 1 wherein redefining the distribution of controller parameters includes selecting the quantity of the sets of simulations having the lowest average cost function values, and defining a new mean and a new standard deviation for each of the controller parameters based on the controller parameters in the quantity of sets which were selected.

11. The method according to claim 1 wherein the robotic assembly operation includes one of fitting a non-axisymmetric planar part into a mating aperture, assembling a two-peg part with a two-hole part, or inserting an electrical connector into a mating connector.

12. The method according to claim 1 further comprising using the final tuned parameters in a robot controller configured with a compliance controller to perform a real-world assembly operation.

13. A computer-implemented method for autonomously tuning controller parameters for a robotic assembly operation, said method comprising using a numerical optimization algorithm to optimize values of the controller parameters, wherein a plurality of random samples are selected from a distribution of the controller parameters, and a set of simulations of the assembly operation is run for each of the samples in the plurality, where each set of simulations includes a plurality of simulations each using a different pose deviation of a fixed part, and where the distribution of the controller parameters is redefined based on a subset of the sets of simulations having best assembly performance until a convergence criteria is met.

14. The method according to claim 13 wherein the controller parameters to be tuned include an input target force vector to a compliance controller model, in six degrees of freedom, for each step in a multi-step assembly path, where the simulations include the compliance controller model which computes robot motions based on a difference between the input target force vector and a feedback contact force vector, and the simulations include contact dynamics between parts being assembled using solid models of the parts and the feedback contact force vector is computed from the contact dynamics.

15. A system for performing a robotic assembly operation of a first part with a second part, said system comprising:
a computer with a processor and memory, said computer being configured for autonomously tuning controller parameters for the robotic assembly operation including using a numerical optimization algorithm to optimize values of the controller parameters, wherein a plurality of random samples are selected from a distribution of the controller parameters, and a set of simulations of the assembly operation is run for each of the samples in the plurality, where each set of simulations includes a plurality of simulations each using a different fixed pose deviation of the second part, and where the distribution of the controller parameters is redefined based on a subset of the sets of simulations having best assembly performance until a convergence criteria is met; and a robot controller controlling a robot, said controller being configured with a compliance controller to perform the robotic assembly operation, where the compliance controller uses the optimized values of the controller parameters from the computer.

16. The system according to claim 15 wherein the simulations include a compliance controller model of a robot performing the assembly operation.

17. The system according to claim 16 wherein the controller parameters to be tuned include an input target force vector to the compliance controller model, in six degrees of freedom, for each step in a multi-step assembly path.

18. The system according to claim 17 wherein the compliance controller model computes robot motions based on a difference between the input target force vector and a feedback contact force vector.

19. The system according to claim 18 wherein the simulations include contact dynamics between the first and second parts using solid models of the parts, and the feedback contact force vector is computed from the contact dynamics.

20. The system according to claim 15 wherein the fixed pose deviation of the second part is chosen randomly from a range of pose deviations, and includes a combination of three orthogonal position deviations and three orthogonal orientation deviations.

21. The system according to claim 15 wherein the subset of the sets of simulations having best assembly performance is determined by a cost function value computed based on a final assembled position error after each simulation, where a lower cost function value designates a smaller error.

22. The system according to claim 15 wherein the convergence criteria is met when a percentage of the simulations meeting a maximum cost function value criteria exceeds a predefined threshold.

23. The system according to claim 15 wherein using a numerical optimization algorithm includes using Covariance Matrix Adaptation Evolution Strategy (CMA-ES) Optimization.

24. The system according to claim 15 wherein the distribution of the controller parameters is redefined by selecting a quantity of the sets of simulations having lowest average cost function values, and defining a new mean and a new standard deviation for each of the controller parameters based on the controller parameters in the quantity of sets which were selected.

25. The system according to claim 15 wherein the robotic assembly operation includes one of fitting a non-axisymmetric planar part into a mating aperture, assembling a two-peg part with a two-hole part, or inserting an electrical connector into a mating connector.

* * * * *